United States Patent [19]

Noack

[11] 4,079,018

[45] Mar. 14, 1978

[54] CATALYZED HYDRAZINE COMPOSITIONS AND METHODS OF THEIR USE

[75] Inventor: Manfred G. Noack, Northford, Conn.

[73] Assignee: Olin Corporation, New Haven, Conn.

[21] Appl. No.: 763,194

[22] Filed: Jan. 27, 1977

Related U.S. Application Data

[63] Continuation-in-part of Ser. No. 660,808, Feb. 24, 1976, Pat. No. 4,022,712.

[51] Int. Cl.$^2$ .................. C23F 11/14; C23F 11/18
[52] U.S. Cl. .................. 252/389 R; 21/2.5 R; 21/2.7 R; 106/14; 210/63 R; 252/8.55 E; 252/181; 252/184; 252/188; 252/392; 252/393
[58] Field of Search .................. 252/389 R, 392, 393, 252/8.55 E, 181, 184, 188; 21/2.7 R, 2.5 R; 106/14; 210/63 R

[56] References Cited

U.S. PATENT DOCUMENTS

| 3,645,896 | 2/1972 | Larsen | 252/390 |
| 3,728,281 | 4/1973 | Marks et al. | 252/392 |
| 3,843,547 | 10/1974 | Kaufman et al. | 252/392 |

Primary Examiner—Benjamin R. Padgett
Assistant Examiner—Irwin Gluck
Attorney, Agent, or Firm—William A. Simons; Thomas P. O'Day

[57] ABSTRACT

Corrosion inhibiting compositions are described which contain a hydrazine compound, an organometallic complex, and, preferably, a quinone compound. The organometallic complex is the reaction product of a cobaltous or manganous hydroxide and one or more organic ligands selected from the group consisting of unsubstituted and substituted amino derivatives of carboxylic acids and salts thereof. The quinone compound is preferably added to these compositions in order to render them compatible with chelating phosphonate scale control agents. The use of these compositions as oxygen scavengers in corrosive environments is also described.

40 Claims, No Drawings

CATALYZED HYDRAZINE COMPOSITIONS AND METHODS OF THEIR USE

CROSS-REFERENCES TO RELATED APPLICATIONS

This application is a continuation-in-part application of U.S. patent application Ser. No. 660,808 filed on Feb. 24, 1976 now U.S. Pat. No. 4,022,712 by the present inventor, and entitled, "Catalyzed Hydrazine Compound Corrosion Inhibiting Composition Containing Complex of Metal Salt and Amino Derivative of Carboxylic Acid and Its Use." This application is also related to U.S. patent application Ser. No. 660,807, filed on Feb. 24, 1976 now U.S. Pat. No. 4,022,711 by the present inventor, and entitled, "Catalyzed Hydrazine Compound Corrosion Inhibiting Composition Containing a Complex of Metal Salt and Amino Derivative of Carboxylic Acid and A Quinone Compound."

BACKGROUND OF THE INVENTION

A. Field of the Invention

The present invention relates to catalyzed hydrazine compound corrosion inhibiting compositions and their use in corrosive environments. More particularly, the present invention relates to compositions comprising a hydrazine compound, a catalytic organometallic complex which enhances oxygen scavenging, and preferably, a quinone compound which renders the composition compatible with chelating phosphonate scale control agents. The present invention further relates to the uses of these compositions either to inhibit or reduce corrosion or to remove oxygen.

B. Description of the Prior Art

It is well known to use hydrazine compounds for the removal of oxygen from gases and liquids to retard the corrosion of metal surfaces. Among the more important commercial uses of hydrazine compounds for this purpose are in water and steam apparatus such as boilers, hot water heating systems and water cooling systems. These hydrazine compounds are also used in inorganic and organic fluid heat exchange systems, e.g., alkylene glycol coolant systems. It is believed that the hydrazine compound reacts in the systems whereby the hydrogen from the hydrazine compound combines with the oxygen to form water or other compounds so as to bind up the oxygen and thereby inhibit corrosion.

The rate of reaction of a hydrazine compound, e.g., hydrazine, monomethyl hydrazine or the like, with oxygen at ambient temperatures or lower, is relatively slow. As a result, numerous suggestions have been made in the art to add catalytic or accelerating agents to the hydrazine compound or to modify hydrazine-containing systems to facilitate oxygen removal or scavenging in fluidic corrosive environments or to otherwise treat water systems. Thus various hydrazine compound systems have been suggested. Examples are described in U.S. Pat. Nos. 3,551,349 to Kallfass, 3,639,263 to Troscinski et al, 3,645,896 to Larsen, 3,687,610 to Gilson et al, 3,728,281 to Marks et al, 3,808,138 to Yamaguchi et al, 3,843,547 to Kaufman et al, and 3,983,048 to Schiessl et al, and in Japanese Kokai No. 155,048/75 assigned to Kurita.

In the two related patent applications mentioned above having the same inventor as herein, it was described that certain organometallic complexes, when used in combination with a hydrazine compound in corrosive environments, significantly increase the rate of reaction of the hydrazine compound in removing oxygen, even to a surprisingly significant degree at ambient or lower temperatures. In particular, the organometallic complexes described therein had not heretofore been taught or suggested in the prior art literature and are high performers as oxygen scavenging catalysts for hydrazine compounds. Further, the inclusion of the quinone compounds described in U.S. patent application Ser. No. 660,807 was discovered to additionally aid in the compatibility of these compositions with commercially used chelating phosphonate scale control agents in said corrosive environments.

Although the compositions described in these two patent applications are highly effective in removing dissolved oxygen from liquids and inhibiting corrosion of metals exposed to said liquids, certain impurities and inconveniences arise from their preparation. Specifically, in the making of the organometallic complexes, it was taught to react an inorganic salt of cobalt, manganese or copper (e.g., containing anions such as chloride, nitrate, bromide, iodide or sulfate) with certain organic ligands to obtain the catalytic complex. When these complexes are combined with the hydrazine compound (and preferably, in some instances, also with a quinone compound) to obtain the described corrosion inhibiting compositions, the anions in the inorganic salt were left as impurities in the final product.

In processes such as deoxygenation of feed water for low and medium pressure stream generators, the presence of these anions is judged to be harmless. However, in certain applications (e.g., in the feed water for high-pressure boilers having a pressure of about 1500 psig or more) the presence of these anions is undesirable because the tolerance to impurities in such systems is very low. Moreover, the employment of certain anions (e.g., nitrates) may cause a fire hazard to arise from mixing the inorganic salt with the hydrazine compound. For example, if cobalt nitrate hexahydrate is mixed in a certain ratio with hydrazine hydrate, the resulting solution may self-ignite upon heating at approximately 80° C. Therefore, when a catalyzed hydrazine solution is to be prepared with the use of the above cobalt nitrate, it is a normal practice to first combine the hydrazine compound with the organic ligand and then add to them a dilute solution, preferably aqueous, of the above cobalt nitrate. However, this multi-step addition procedure and the prior dilution of the cobalt inorganic salt is not desirable on a large commercial production scale for cost and processing reasons. Instead, it would be more advantageous to employ a simplified method of addition of these three components with no prior dilution of any of them.

BRIEF SUMMARY OF THE INVENTION

Accordingly, the present invention is an improvement upon the catalyzed hydrazine compositions and methods of their use described in the above-mentioned related patent applications. Specifically, this improvement relates to employing either cobaltous or manganous hydroxide instead of the inorganic salts of these transition metals to form the catalytic organometallic complexes. By making this substitution, the impurity problem cited above may be overcome and also the method of preparation may be simplified.

DETAILED DESCRIPTION

The novel compositions of the present invention contain a hydrazine compound, a catalytic organometallic complex and preferably, a quinone compound. The hydrazine compound employed in the compositions of the present invention may be hydrazine itself or it may be any of the hydrazine compounds which function as oxygen scavengers in fluidic corrosive environments. Thus, hydrazine compounds such as methylhydrazine, ethylhydrazine, propylhydrazine, butylhydrazine, 1,1-dimethylhydrazine, 1,1-dibutylhydrazine, and higher alkylated hydrazine compounds, hydroxy alkyl hydrazine, for example, hydroxyethyl hydrazine, as well as aromatic and aralkyl hydrazine compounds, may be employed. The hydrazine compound may be any of these or a mixture of these and may be used in anhydrous form or in an aqueous solution.

Most preferred of the above hydrazine compounds is hydrazine itself. Moreover, an aqueous solution of hydrazine is preferred when the composition is to be used in water-based corrosive environments. And, when organic fluid environments are involved, hydrazine may be used in an organic solution, e.g., in a lower alkylene glycol solution. Furthermore, in addition to the above hydrazine compounds, inorganic and/or organic salts thereof may be employed to replace part or all of the hydrazine compounds wherever they are compatible with the fluidic system. Suitable inorganic hydrazine compounds which may be used include hydrazine phosphate, hydrazine monohydrochloride and dihydrochloride, hydrazine monohydrobromide and dihydrobromide, monohydrosulfate and dihydrosulfate, and the like. Of course, if these latter salts are employed, the undesirable anions may become present in the mixture.

When the above hydrazine compounds are employed in either an aqueous, inorganic or organic solution, any workable solvent may be used as long as the solvent is compatible with the fluidic corrosive environment which is to be treated. There is no criticality in the amount of solvent employed because the solvent will be compatible with and may become part of the system which is to be treated. However, as a practical and economical matter, regardless of the solvent chosen, generally at least about 1 mole to about 100 moles, and preferably about 1.5 moles to about 20 moles of the solvent are used per mole of hydrazine compound. The exact amount may be somewhat influenced by the particular hydrazine compound chosen or simply may be dictated by the commercial availability of particular solutions. For example, when an aqueous solution is used, the solution may contain about 5 to about 64 percent hydrazine compound by weight, based on the total weight of the water and the hydrazine compound. When an organic solution is used, it may contain about 5 to about 40 percent by weight of hydrazine compound, for example, based on the total weight of the organic solvent and the hydrazine compound.

The organometallic complex used in the compositions of the present inventions are the reaction products of cobaltous or managous hydroxide and selected organic ligands. In most cases, the cobaltous hydroxide (Co(OH)$_2$) is favored over manganous hydroxide (Mn(OH)$_2$) because of its faster rate of oxygen removal. However, both hydroxides, along with unstable hydroxides such as cobaltic or manganic hydroxides, are suitable for the present invention. These latter forms (i.e., Co(OH)$_3$ and Mn(OH)$_3$) normally will quickly reduce down to the cobaltous or manganous form in the presence of the above hydrazine compounds. Cobaltous and manganous hydroxide are both available commercially in various forms (e.g., "hydrate" or a dry powder, aqueous suspensions or slurries and the like) which can be readily used in the present invention. It has been surprisingly discovered that these hydroxides of cobalt and manganese which are normally insoluble in water or only slightly soluble in an aqueous hydrazine solution will dissolve readily and form the catalytic complex when sufficient ligand is present. Moreover, as stated above, no undesirable impurities are introduced into the corrosion-inhibiting composition when the hydroxide (rather than an inorganic salt) is employed.

In order to form the organometallic complex used in the compositions of the present invention, the above hydroxides are reacted with one or more organic ligands selected from the group consisting of unsubstituted and substituted amino derivatives of carboxylic acids and salts of these unsubstituted and substituted derivatives. These organic ligands are aliphatic or aromatic compounds which may have only one amino group or may have two or more amino groups, as more fully described below. The substituents which may be part of the organic ligand include any which do not hinder the formation of the organometallic complex or interfere with the oxygen scavenger accelerating function of the compositions of the present invention and will include alkyl, aralkyl, alkaryl, and aryl groups, e.g., having about 1 to about 14 and preferably about 1 to about 7 carbon atoms, as well as inorganic substituents such as the sulfonic acid radical and the like. These inert substituents may be located in any of the positions not occupied by the aforesaid amino radical or radicals. For example, these inert substituents may be located on A in Formula (II) shown below or on Y in Formula (VIII) shown below. The salt forms of these organic ligands include the replacement of the hydrogen in the carboxylic acid radical of the ligand with a suitable cation, e.g., metal ion or ammonium or hydrazinium, which is capable of being replaced by a cobaltous or manganous ion. See the definition of B in the formulas below.

The organic ligands which may be used in forming the organometallic complexes used in the composition of the present invention include those having the general formula:

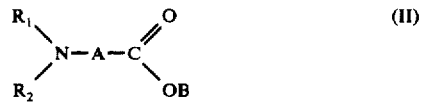

(II)

wherein A is a branched or straight chain alkylene having 1 to about 10 carbon atoms, B is hydrogen or any suitable cation, e.g., metal ion or ammonium or hydrazinium, which is capable of being replaced by a cobaltous or manganous ion; and R$_1$ and R$_2$ are each independently selected from the group consisting of hydrogen, alkyls, aryls, the radical:

(III)

wherein A and B are defined above, and the radical:

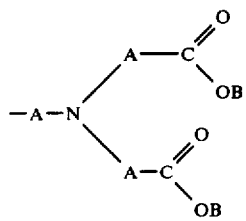

(IV)

wherein each A and B are independently selected from the groups defined for A and B above, respectively.

Desirably, the ligand used in preparing the compound of the present invention is one having the structure of Formula (II) above wherein A has 1 to 4 carbon atoms, $R_1$ and $R_2$ are each independently selected from the group consisting of hydrogen, alkyls having 1 to 10 carbon atoms, aryls having 6 to 14 carbon atoms and the radicals of Formulas (III) and (IV) above wherein A has 1 to 4 carbon atoms. Preferably, the ligand is one having the structure of Formula (II) above wherein A has 1 to 3 carbon atoms and $R_1$ and $R_2$ are each independently selected from the group consisting of hydrogen, alkyls having 1 to 4 carbon atoms and the radicals of Formulas (III) and (IV) above wherein A has 1 to 3 carbon atoms.

Exemplary of the most preferred ligands are (1) glycine and its salts, having the formula:

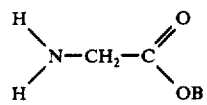

(V)

(2) nitrilotriacetic acid (NTA) and its salts, having the formula:

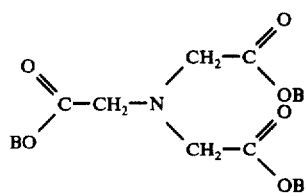

(VI)

and (3) ethylenediamine tetraacetic acid (EDTA) and its salts, having the formula:

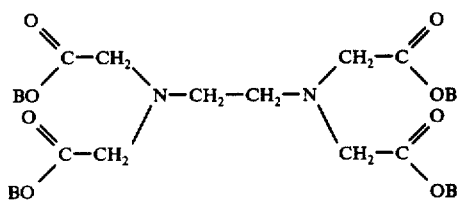

(VII)

wherein B for each of Formulas (V) through (VII) is as defined above, and especially wherein B is hydrogen.

Further, in addition to, though less desirable than the compounds represented by the foregoing, the organic ligands which may be used in forming the organometallic complexes used in the composition of the present invention also include those having the general formula:

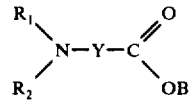

(VIII)

wherein B, R, and $R_2$ are as defined above, and
wherein Y is a substituted or unsubstituted ortho-arylene biradical.

Of the compounds represented by Formula (VIII) above, desirably Y is an ortho-phenylene or toluene or naphthalene radical, and $R_1$ and $R_2$ are each independently selected from the group consisting of hydrogen, alkyls having 1 to 10 carbon atoms, aryls having 6 to 14 carbon atoms and the radicals of Formulas (III) and (IV) above wherein A has 1 to 4 carbon atoms. Of the compounds represented by Formula (VIII) above, preferred are those wherein Y is an ortho-phenylene or toluene or naphthalene radical, and $R_1$ and $R_2$ are each independently selected from the group consisting of hydrogen, alkyls having 1 to 4 carbon atoms, and the radicals of Formula (III) and (IV) wherein A has 1 to 3 carbon atoms.

Exemplary of the compounds represented by Formula (VIII) are the following:

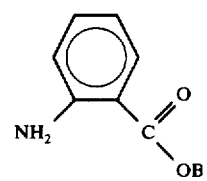

(IX)

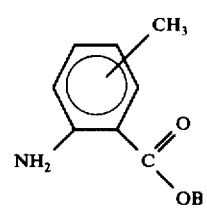

(X)

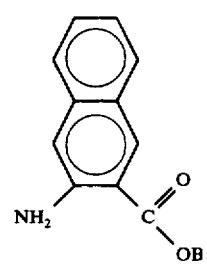

(XI)

wherein, as applied to each of Formulas IX, X, and XI, B has the significance indicated above.

In forming the organometallic complexes, the hydroxide is reacted with the organic ligand so that about 0.1 to about 20 or even more gram-moles, and preferably about 0.5 to about 5 gram-moles of ligand are used per gram-atom of metal ion. Within these ranges, the optimum ratios of these two reactants will in general depend upon the particular ligand which is employed. Illustrative optimum ratios will be from about 0.8 to about 1.5 gram-moles of EDTA per gram-atom of metal ion, from about 1.6 to about 3.0 gram-moles of NTA per gram-atom of metal ion and from about 2.0 to about 4.5 gram-moles of glycine per gram-atom of metal ion.

These two components may advantageously be combined and reacted at room temperature and at atmospheric pressure. However, lower or higher temperatures and negative or positive pressures may be employed, if desired. Thus, temperatures ranging from about 10° or lower to about 100° C or higher, and preferably from about 20° to about 50° C, and pressures from as low as 5 psi up to about 30 psi, and preferably within the range of from about 10 to about 15 psi may be used. At any rate, it can be seen that any combination of temperature and pressure may be used in preparing the organometallic complex provided that there is no significant detrimental effect on the reaction or on the desired products.

The reaction of the hydroxide and the organic ligand generally occurs in a reasonably short period of time and a significant amount of organometallic complex is obtained within a matter of minutes. The resulting organometallic complex may be dissolved in the reaction mixture or it may precipitate out of the reaction mixture. Regardless of the particular form of the organometallic complex, the complex is compatible with the reaction mixture and may be stored therein for an indefinite period of time. Because the reaction is usually completed in most cases somewhat in less than one hour and because the desired complex may be stored in the reaction mixture, there is no criticality to the maximum residence time involved in the reaction between the hydroxide and the organic ligand used in the present invention. If or when desired, the organometallic complex may be separated from the reaction mixture by any conventional means, e.g., by filtration or by distillation of the solvent. Alternatively, the organometallic complex need not be separated from the reaction mixture and the entire entity may be used as a component for the composition of the present invention.

The quinone compound which is used in preferred embodiments of the present invention may be any quinone compound which renders the composition compatible with known chelating phosphonate scale control agents. Among the quinone compounds which may be used are the paraquinones, para-hydroquinones, para-naphthoquinones, para-anthraquinones, para-hydronaphthoquinones, para-hydroanthraquinones, and the like, as well as their substituted derivatives. These include alkyl and aryl substituted quinone compounds as well as those having hydrophilic substituents. Among the desired quinone compounds which may be used are the alkylated and arylated para-quinones and para-hydroquinones having 1 to about 10 carbon atoms in the substituent, and those having substituents which are either derivatives of carboxylic acids, sulfonic acids, carboxylic acid alkali metal salts, or sulfonic acid alkali metal salts. Preferred are the lower alkyl para-quinones and para-hydroquinones having 1 to 5 carbon atoms in the alkyl substituents. Of these, the most preferred is methylhydroquinone, also known as toluhydroquinone.

In the present invention organometallic complexes as described above are combined with the hydrazine compound, and preferably also with the quinone compound, to form the compositions of the present invention. In general at least about 0.0005 parts, preferably in the range of about 0.002 parts to about 0.10 parts, by weight of the organometallic complex are used per every one part by weight of the hydrazine compound. In the most preferred embodiment of the present invention, from about 0.005 to about 0.03 parts by weight of the organometallic complex are employed per part of the hydrazine compound. The use of amounts of organometallic complex below the lowest limit cited above results in a certain reduction in the catalytic effect on the oxygen-scavenging action of the hydrazine compound. The use of amounts of organometallic complex above the relative 0.1 parts by weight normally is uneconomical and does not give any further improvement to the desired catalytic action. However, it may be desirable to store and/or ship the compositions in a concentrated form whereby the amount of organometallic complex is greater than this upper limit. Such concentrated solutions are also encompassed by the present invention.

The quinone compound is preferably used in amounts of at least 0.0005 parts, more preferably in the range of from about 0.001 to 0.1, and most preferably in the range of from about 0.005 to about 0.02 parts, by weight with one part by weight of the hydrazine compound. Amounts of quinone compound below the lowest limit cited herein start to lose the desired effect. Furthermore, amounts of quinone compounds above about 0.1 part by weight are uneconomical and do not add anything to the present compositions. However, since it may be desirable to store and/or ship these compounds in concentrated form, there is no upper limit as to amount of quinone compound in the compositions of the present invention.

In one preferred embodiment, the organometallic complex, the quinone compound, and the hydrazine compound may be combined in one step prior to use of the resulting composition as a corrosion inhibitor, or the three components may be added separately or in any suitable combination to the fluid in the system to be treated. As alternatives to combining the organometallic complex and the quinone compound with the hydrazine compound either before or after being added to the fluidic corrosive environment to be treated, other approaches may advantageously be used. In one preferred embodiment, the organic ligand may be dissolved in a hydrazine compound solution and the cobaltous or manganous hydroxide, either in solid or suspension form, may subsequently be combined with the organic ligand-hydrazine compound solution, either before or after the organic ligand-hydrazine compound solution is added to the fluidic system to be treated, and the quinone compound may be added at any time.

In another preferred embodiment of the present invention, the hydroxide may first be suspended in a hydrazine compound solution and then the organic ligand may be combined therewith either before or after the hydroxide-hydrazine compound solution is added to the fluidic system to be treated and the quinone compound may be added to any component at any time. It should be noted that in these embodiments wherein the hydroxide and the organic ligand are not combined until added to the fluidic system to be treated, the organometallic complex is formed in situ. It should also be noted that regardless of the particular combining approach taken, the relative amounts of hydrazine compound, organic ligand, hydroxide, and quinone compound used are those set forth above. Therefore, it is clearly understood that the order of addition of the above-mentioned components to the environment is not critical and any suitable method of addition which results in the desired catalytic effect is encompassed within the scope of the invention.

In summary, the above compositions are used to inhibit oxygen corrosion in fluidic corrosive environments. These compositions are generally combined with the fluid in the system to be treated so that at least about a stoichiometric amount of hydrazine compound is present based on the amount of dissolved oxygen in the system. Typically, this may mean that the composition is used so that the hydrazine compound concentration in the fluidic system, after admixing, but before reaction with the dissolved oxygen takes place, is in the range of about 0.001 to about 1,000 ppm, e.g., about 0.01 to about 400 ppm. The particular method used in combining the corrosion inhibiting compositions of the present invention may be any of those which have been previously described and the physical techniques of addition may be any of those which are well known in the art with respect to the use of hydrazine as an oxygen scavenger. Likewise, the methods of determining the amount of oxygen present in a fluidic system are well known in the art and need not be described herein.

The following examples are provided to illustrate the invention without any intention of being limited thereby. All parts and percentages are by weight unless otherwise specified.

EXAMPLE I

A quantity of 547 ml of hydrazine hydrate (approximately 361 g $N_2H_4$) is charged to a 2000 ml flask while passage of nitrogen through a side arm prevents air from contacting its contents. Free acid EDTA ($H_4$EDTA) is then added in the amount of 4.8 grams to the stirred solution. Subsequently, one adds 1.7 grams of commercial "cobalt hydrate" (Co(OH)$_2$ containing 61 wt. % Co) and dissolves by stirring for about 10 minutes. Addition of 2.04 grams of toluhydroquinone and 543 ml distilled water yields a corrosion inhibiting composition wherein no anionic impurities resulting from use of cobalt salts are present.

EXAMPLE II

A quantity of 100 ml 35% hydrazine is charged to a nitrogen-blanketed 500 ml flask equipped with stirrer. Sequential addition of 0.48 grams $H_2$EDTA, 0.17 g "cobalt hydrate" and 0.2 grams toluhydroquinone, each after the preceding has been dissolved by stirring, gives the corrosion inhibiting composition.

EXAMPLE III 4000 ml aqueous hydrazine solution containing 35% $N_2H_4$ by weight are charged to a 6000 ml stirred flask which is blanketed by nitrogen. Subsequent addition of 107 grams $H_4$EDTA, 38 grams "cobalt hydrate" and 50 grams toluhydroquinone gives a catalyst concentrate suitable for mixing with 35% $N_2H_4$ solution. For example, combination of 1 part of concentrate with 4.56 parts of 35% aqueous hydrazine solution gives the corrosion inhibiting composition in accordance with Examples 1 and 2.

EXAMPLE IV

Approximately 520 mg of $H_4$EDTA, 88 ml hydrazine hydrate and 70 ml distilled water are combined in a stirred nitrogen-blanketed flask. A weighed quantity of 172 mg "cobalt hydrate" (commercial cobaltous hydroxide) is then transferred quantitatively to the flask from a tared container by rinsing with 1 ml water. Complete dissolutuion of "cobalt hydrate" occurs upon stirring for several minutes. And, a corrosion inhibiting composition is obtained.

EXAMPLE V

Quantities of approximately 44 ml hydrazine hydrate, 35 ml water and 350 mg nitrilotriacetic acid (NTA) are combined in stirred nitrogen-blanketed flask to which one subsequently adds 86 mg "cobalt hydrate." A clear pink solution is obtained upon stirring for several minutes.

EXAMPLE VI

The procedure of Example V is repeated except that approximately 250 mg toluhydroquinone are also added and dissolved.

EXAMPLE VII

The procedure of Example V is repeated except that approximately 86 mg manganous hydroxide are added to the solution of hydrazine and approximately 350 mg NTA.

EXAMPLE VIII

The procedure of Example VII is repeated except that approximately 250 mg toluhydroquinone are dissolved in addition to the other components.

EXAMPLE IX

Measurement of Oxygen Removal

To measure rates of oxygen removal, one places approximately 1060 ml of a solution containing approximately 7 ppm dissolved $O_2$ and sodium bicarbonate and carbonate (to give a pH of 10) in a stirred Erlenmeyer flask. The flask is fitted with a selective membrane electrode for measurement of dissolved oxygen concentration. A hydrazine solution without catalyst; a hydrazine solution containing [CoEDTA]$^=$ and toluhydroquinone catalyst (prepared from Co(No$_3$)$_2$·6H$_2$O, disodium salt of EDTA, and toluhydroquinone in accordance with U.S. patent application Ser. No. 660,807; and hydrazine solutions prepared in accordance with the examples recited herein are then injected in sufficient quantity to bring $N_2H_4$ concentration before reaction with oxygen occurs to 150 ppm. The subsequent decrease in oxygen concentration is recorded as a function of time.

An examination of times required for oxygen removal as summarized in Table I demonstrates the accelerating effect of the catalysts prepared in accordance with this invention. A comparison of oxygen removal with [CoEDTA]$^=$/toluhydroquinone-catalyzed hydrazine prepared from Co(OH)$_2$, $H_4$EDTA and toluhydroquinone in accordance with this invention with the corresponding solution prepared from Co(NO$_3$)$_2$·6H$_2$O, disodium salt of EDTA and toluhydroquinone in accordance with U.S. patent application Ser. No. 660,807, demonstrates that the solutions are equivalent in terms of oxygen removal. It is thus apparent that the same or similar active species of catalyst are obtained in the method of this invention as in the previously disclosed method although the novel method disclosed herein will not result in the introduction of impurities into the corrosion-inhibiting composition.

TABLE I

Oxygen Removal with Hydrazine and Catalyzed Hydrazine Solutions

| Solution of Example No. | Catalyst | Time (min) Required for Removal of | | | |
|---|---|---|---|---|---|
| | | 25 | 50 | 75 | 95% of $O_2$ |
| — | none | 7.0 | — | — | — |

TABLE I-continued
Oxygen Removal with Hydrazine and Catalyzed Hydrazine Solutions

| Solution of Example No | Catalyst | Time (min) Required for Removal of 25 | 50 | 75 | 95% of O₂ |
|---|---|---|---|---|---|
| — | Co/EDTA/THQ[a] | 0.1 | 0.3 | 0.5 | 1.1 |
| 1 - 3 | Co/EDTA/THQ[b] | 0.1 | 0.3 | 0.6 | 1.1 |
| 4 | Co/EDTA[c] | 1.7 | 4.0 | 7.2 | 11.0 |
| 5 | Co/NTA[d] | 0.5 | 1.2 | 2.1 | 4.2 |
| 6 | Co/NTA/THQ | 0.1 | 0.2 | 0.4 | 0.8 |
| 7 | Mn/NTA | 2.1 | 5.2 | — | — |
| 8 | Mn/NTA/THQ | 0.1 | 0.2 | 0.4 | 0.8 |

[a]Solution prepared from Co(NO₃)₂ . 6H₂O, disodium salt of EDTA and toluhydroquinone
[b]THQ = Toluhydroquinone
[c]EDTA = free acid ethylene diamine tetraacetic acid
[d]NTA = nitrilotriacetic acid

What is claimed is:

1. A composition comprising:
   (a) a hydrazine compound; and
   (b) at least about 0.0005 parts by weight of an organometallic complex per part of hydrazine compound, said organometallic complex being the reaction product of:
      (i) a hydroxide selected from the group consisting of cobaltous hydroxide and manganous hydroxide; and
      (ii) at least one organic ligand selected from the group consisting of unsubstituted and substituted amino derivatives of carboxylic acids and salts thereof.

2. The composition of claim 1 wherein said hydroxide is cobaltous hydroxide.

3. The composition of claim 1 wherein said organic ligand is ethylenediamine tetraacetic acid or a salt thereof.

4. The composition of claim 1 wherein said hydrazine compound is hydrazine.

5. The composition of claim 1 wherein said hydrazine compound is in an aqueous solution containing about 5 to about 64 percent hydrazine compound by weight, based on the total weight of the water and the hydrazine compound.

6. A composition as claimed in claim 1 which also comprises at least 0.0005 parts by weight of a quinone compound per one part of hydrazine compound.

7. The composition of claim 6 wherein said quinone compound is selected from the group consisting of a para-quinone, a para-hydroquinone, a para-naphthoquinone, a para-anthraquinone, a para-hydronaphthoquinone, a para-hydroanthraquinone, or a substituted derivative thereof.

8. The composition of claim 1 wherein said organometallic complex is the reaction product of said hydroxide and one or more ligands having the formula:

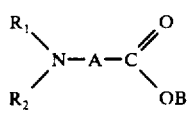

wherein A is a branched or straight chain alkylene radical having 1 to about 10 carbon atoms; B is hydrogen or any suitable cation which is capable of being replaced by cobaltous or manganous ion; and $R_1$ and $R_2$ are each independently selected from the group consisting of hydrogen, an alkyl radical, an aryl radical, a radical represented by the formula:

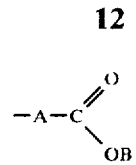

wherein A and B are as defined above, and a radical represented by the formula:

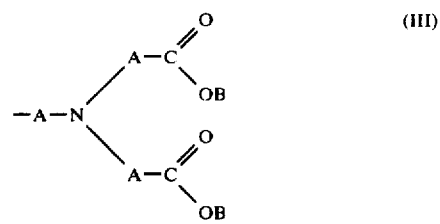

wherein each of A and B is independently defined as above.

9. The composition of claim 8 which also comprises at least 0.0005 parts by weight of a quinone compound per one part of hydrazine compound.

10. The composition of claim 8 wherein said hydrazine compound is hydrazine.

11. The composition of claim 10 wherein said hydroxide is cobaltous hydroxide.

12. The composition of claim 10 which also comprises at least 0.0005 parts by weight of a quinone compound per one part of hydrazine compound.

13. The composition of claim 11 wherein, the ligand is one having the structure of Formula (I) above wherein A has 1 to 3 carbon atoms, and $R_1$ and $R_2$ are each independently selected from the group consisting of hydrogen, alkyls having 1 to 4 carbon atoms and the radicals of Formulas (II) and (III) above wherein A has 1 to 3 carbon atoms.

14. The composition of claim 13 wherein said organic ligand is selected from the group consisting of glycine, nitrilotriacetic acid, ethylenediamine tetraacetic acid, and their salts.

15. A composition as claimed in claim 14 which also comprises at least 0.0005 parts by weight of a quinone compound per one part of hydrazine compound.

16. The composition of claim 15 wherein said quinone compound is selected from the group consisting of a para-quinone, a para-hydroquinone, a para-naphthoquinone, a para-anthraquinone, a para-hydronaphthoquinone, a para-hydroanthraquinone, or a substituted derivative thereof.

17. The composition of claim 16 wherein said organic ligand is ethylenediamine tetraacetic acid or a salt thereof and said quinone compound is methylhydroquinone.

18. The composition of claim 17 wherein about 0.002 parts to about 0.10 parts by weight of the organometallic complex is used per part of hydrazine compound.

19. The composition of claim 18 wherein about 0.005 parts to about 0.02 parts by weight of the quinone compound is used per part of hydrazine compound.

20. A method of treating a fluidic corrosive environment to remove oxygen therefrom and inhibit corrosion therein, which comprises treating said environment with a composition comprising:
   (a) a hydrazine compound; and
   (b) at least about 0.0005 parts by weight of an organometallic complex per part of hydrazine compound, said organometallic complex being the reaction product of:
(i) a hydroxide selected from the group consisting of cobaltous hydroxide and manganous hydroxide; and
(ii) one or more organic ligands selected from the group consisting of unsubstituted and substituted amino derivatives of carboxylic acids and salts thereof.

21. The method of claim 20 wherein said hydrazine compound is present in at least about a stoichiometric amount based on the amount of oxygen to be removed from said environment.

22. The method of claim 20 wherein said hydroxide is cobaltous hydroxide.

23. The method of claim 20 wherein said organic ligand is ethylenediamine tetraacetic acid or a salt thereof.

24. The method of claim 20 wherein said hydrazine compound is hydrazine.

25. The method of claim 20 wherein said hydrazine compound is in an aqueous solution containing about 5 to about 64 percent hydrazine compound by weight, based on the total weight of the water and the hydrazine compound.

26. The method of claim 20 which also comprises at least 0.0005 parts by weight of a quinone compound per one part of hydrazine compound.

27. The method of claim 26 wherein said quinone compound is selected from the group consisting of a para-quinone, a para-hydroquinone, a para-naphthoquinone, a para-anthraquinone, a para-hydronaphthoquinone, a para-hydroanthraquinone, or a substituted derivative thereof.

28. The method of claim 20 wherein said organometallic complex is the reaction product of said hydroxide and one or more ligands having the formula:

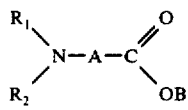

wherein A is a branched or straight chain alkylene radical having 1 to about 10 carbon atoms; B is hydrogen or any suitable cation which is capable of being replaced by cobaltous or manganous ion; and $R_1$ and $R_2$ are each independently selected from the group consisting of hydrogen, an alkyl radical, an aryl radical, a radical represented by the formula:

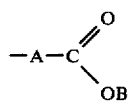

wherein A and B are as defined above, and a radical represented by the formula:

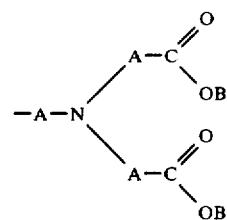

wherein each of A and B is independently defined as above.

29. The method of claim 28 which also comprises at least 0.0005 parts by weight of a quinone compound per one part of hydrazine compound.

30. The method of claim 28 wherein said hydrazine compound is hydrazine.

31. The method of claim 30 wherein said hydroxide is cobaltous hydroxide.

32. The method of claim 30 which also comprises at least 0.0005 parts by weight of a quinone compound per one part of hydrazine compound.

33. The method of claim 31 wherein, the ligand is one having the structure of Formula (I) above wherein A has 1 to 3 carbon atoms, and $R_1$ and $R_2$ are each independently selected from the group consisting of hydrogen, alkyls having 1 to 4 carbon atoms and the radicals of Formulas (II) and (III) abvoe wherein A has 1 to 3 carbon atoms.

34. The method of claim 33 wherein said organic ligand is selected from the group consisting of glycine, nitrilotriacetic acid, ethylenediamine tetraacetic acid, and their salts.

35. A method of claim 34 which also comprises at least 0.0005 parts by weight of a quinone compound per one part of hydrazine compound.

36. A method of claim 35 wherein said quinone compound is selected from the group consisting of a para-quinone, a para-hydroquinone, a para-naphthoquinone, a para-anthraquinone, a para-hydronaphthoquinone, a para-hydroanthraquinone, or a substituted derivative thereof.

37. The method of claim 36 wherein said organic ligand is ethylenediamine tetraacetic acid or a salt thereof and said quinone compound is methylhydroquinone.

38. The method of claim 37 wherein about 0.002 parts to about 0.10 parts by weight of the organometallic complex is used per part of hydrazine compound.

39. The method of claim 38 wherein about 0.005 parts to about 0.02 parts by weight of the quinone compound is used per part of hydrazine compound.

40. The method of claim 39 wherein said hydrazine compound is present in at least about a stoichiometric amount based on the amount of oxygen to be removed from said environment.

* * * * *